United States Patent
Hayashi et al.

(10) Patent No.: US 6,546,617 B1
(45) Date of Patent: Apr. 15, 2003

(54) METHOD OF PEELING OFF COATING OF INSULATED CONDUCTIVE WIRES

(75) Inventors: Mitsuyuki Hayashi, Nishio (JP); Katsumi Shizu, Kariya (JP); Masaru Sugiyama, Okazaki (JP); Yoshio Naka, Toyota (JP); Kazuki Maesoba, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/538,936

(22) Filed: Mar. 31, 2000

(30) Foreign Application Priority Data

| Apr. 2, 1999 | (JP) | .......................... 11-096487 |
| Jul. 9, 1999 | (JP) | .......................... 11-195503 |
| Feb. 8, 2000 | (JP) | .......................... 2000-035674 |

(51) Int. Cl.$^7$ .............................................. H01B 43/00
(52) U.S. Cl. ...................... 29/825; 29/426.4; 29/564.4; 29/877; 30/90.1; 81/9.4; 81/9.51
(58) Field of Search .............................. 29/825, 426.4, 29/546.4, 877; 81/9.4, 9.51; 30/90.1

(56) References Cited

U.S. PATENT DOCUMENTS

| 3,363,309 A | * | 1/1968 | Logan et al. ................. 29/628 |
| 3,741,261 A | * | 6/1973 | Windsor ........................ 140/1 |
| 3,748,932 A | * | 7/1973 | Nieman et al. ............. 81/9.51 |
| 4,393,584 A | * | 7/1983 | Bare et al. ..................... 29/877 |
| 4,827,592 A | * | 5/1989 | Kodera ....................... 29/426.4 |
| 5,179,779 A | | 1/1993 | Iura et al. |
| 5,206,462 A | | 4/1993 | Iura et al. |
| 5,351,396 A | * | 10/1994 | Sawada ........................ 29/885 |
| 5,479,701 A | * | 1/1996 | Yamano et al. ................ 29/825 |
| 5,542,327 A | * | 8/1996 | Schultz ........................ 83/861 |
| 5,600,879 A | * | 2/1997 | Tsuchimoto ................ 29/403.3 |
| 5,669,132 A | * | 9/1997 | Brimmer ................... 29/426.4 |
| 5,705,289 A | * | 1/1998 | Tsuchimoto ................. 424/49 |

FOREIGN PATENT DOCUMENTS

| JP | 55-42568 | 10/1980 |
| JP | 61-58412 | 3/1986 |
| JP | 62-144514 | 6/1987 |
| JP | 64-27026 | 2/1989 |
| JP | 3-98411 | 4/1991 |

* cited by examiner

*Primary Examiner*—Carl J. Arbes
(74) *Attorney, Agent, or Firm*—Oliff & Berridge, PLC

(57) ABSTRACT

A method of peeling off a coating of an elliptical cross sectional insulated conductive wire has a groove forming process of forming a groove nearly perpendicular to a longitudinal direction of the insulated conductive wire at given positions within a peeling region thereof, a first peeling process of peeling off the coating by moving a pair of first cutting edges in a longitudinal direction of the insulated conductive wire and perpendicularly to a longer diameter direction of the cross section thereof toward the groove from opposite ends of the peeling region, and a second peeling process of peeling off the coating at the peeling region by moving a pair of second cutting edges in a direction perpendicular to the longitudinal direction and in parallel with the longer diameter direction of the cross section thereof. As a result, the coating all around the outer circumference of the insulated conductive wire at the peeling region may be completely peeled off.

29 Claims, 14 Drawing Sheets

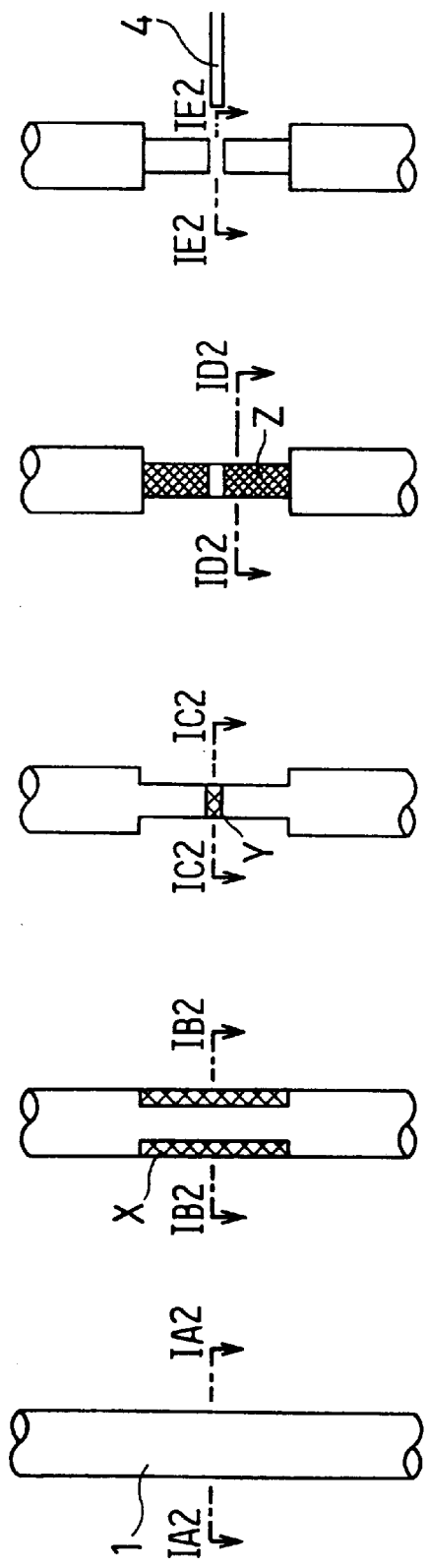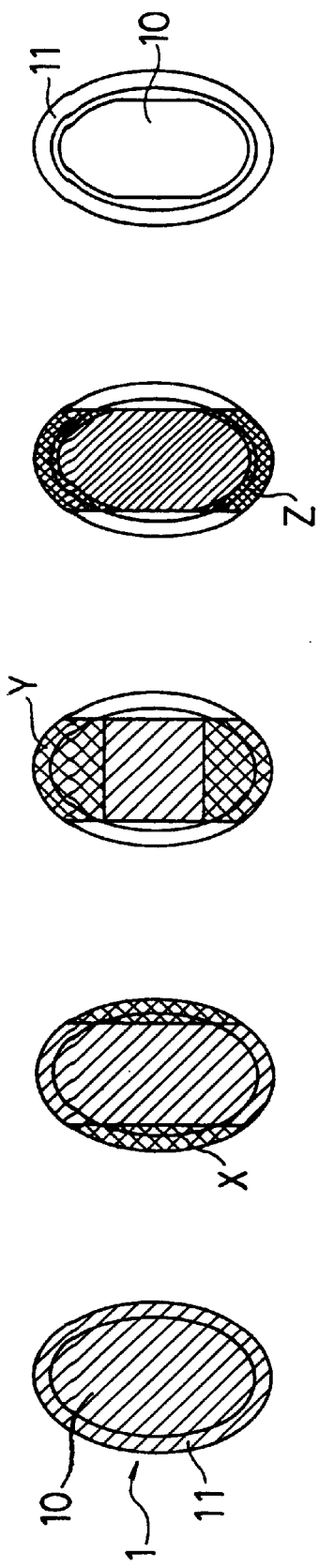

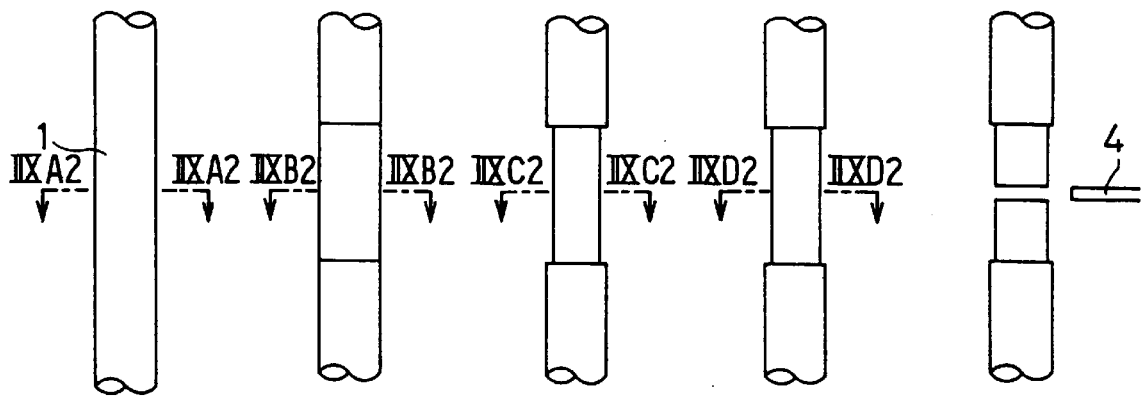
FIG. 8A1  FIG. 8C1  FIG. 8E
FIG. 8B1  FIG. 8D1
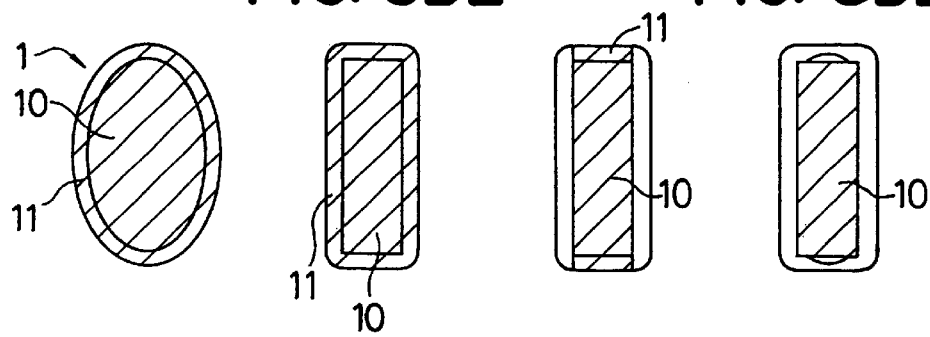
FIG. 8A2  FIG. 8C2
FIG. 8B2  FIG. 8D2
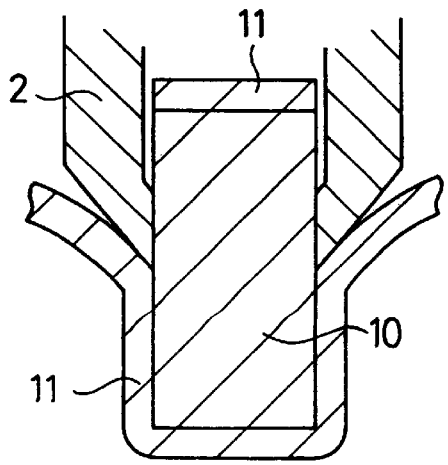
FIG. 9

METHOD OF PEELING OFF COATING OF INSULATED CONDUCTIVE WIRES

CROSS REFERENCE TO RELATED APPLICATIONS

This application is based upon and claims the benefit of priority of Japanese Patent Applications No. H.11-96487 filed on Apr. 2, 1999, No. H.11-195503 filed on Jul. 9, 1999 and No.2000-35674 filed on Feb. 8, 2000, the contents of which are incorporated herein by reference.

BACKGROUND OF THE INVENTION

1. Field of the Invention

The present invention relates to a method of effectively and reliably peeling off a necessary portion of a coating around a circumference of a conductor of an insulated conductive wire.

2. Description of Related Art

According to a conventional method of peeling off a coating of an insulated conductive wire having an elliptical cross section, as shown in FIGS. 20A and 20B, the insulated conductive wire 1 passes through a gap between a pair of grinding stones 5 urged respectively by biasing means such as springs in a direction of bringing the grinding stones 5 close to each other in such a manner that a distance between center axes of the pair of the grinding stones 5 may be varied by a force against the biasing means. That is, when the insulated conductive wire 1 is inserted between the pair of the grinding stones 5, the grinding stones 5 are pushed by the insulated conductive wire 1 so as to move in a direction of enlarging the distance between center axes of the pair of the grinding stones 5. The coating of the insulated conductive wire 1 may be peeled off by a relative movement of the insulated conductive wire 1 to the grinding stones 5 perpendicular to a longitudinal direction of the insulated conductive wire 1. A first grinding processing is carried out, as shown in FIG. 20A, in parallel with a longer diameter direction of the elliptical cross section of the insulated conductive wire 1. Then, a second grinding processing is carried out, as shown in FIG. 20B, perpendicularly to the longer diameter direction of the elliptical cross section of the insulated conductive wire 1 at a position where the grinding stones 5 are rotated relatively to the insulated conductive wire 1 by an angle of 90° around a longitudinal axis thereof. With the conventional method mentioned above, it is intended to peel off the coating 11 all around an outer circumference of the insulated conductive wire 1.

However, mere grinding perpendicularly to both of the longer and shorter diameter directions of the cross section of the insulated conductive wire is likely to leave the coatings on four corner surfaces thereof. Further, though the method is effective and has no problem in a case that a connection of the coating to the conductor is relatively weak, in a case that the insulating resin coating is firmly connected to the conductor and the conductor is made of relatively soft metal such as copper, the method is likely to cause such problems that the coating is partly left on a surface of the conductor after the coating peeling process, a surface roughness control of the conductor is relatively troublesome, or the grinding is made so deeply into the conductor that the conductor becomes too thin.

SUMMARY OF THE INVENTION

The present invention has been made in view of the above mentioned problems, and an object of the present invention is to provide a method of peeling off the coating of the insulated conductive wire by cutting tools without leaving any part of the coating covering the conductor, with an easy control of surface roughness of the conductor and without cutting too deep into the conductor, even if the connection of the coating with the conductor is strong.

To achieve the above object, the method comprises steps of forming a groove nearly perpendicular to a longitudinal direction of the insulated conductive wire by removing the coating and a part of the conductor at a given position within a peeling region of the insulated conductive wire where the coating is to be peeled off, and, then, executing a first peeling process of peeling off the coating at the peeling region by making a first cutting edge cut deep into the conductor so as to penetrate through the coating at a position away from the groove and moving the first cutting edge relatively to the insulated conductive wire in a longitudinal direction thereof toward the groove.

With the method mentioned above, the coating may be completely peeled off since the cutting edge cuts relatively deep into the insulated conductive wire and chips or bars by cutting may be easily separated from a surface of the insulated conductive wire because of the groove perpendicular to a moving direction of the cutting edge.

It is preferable to have, in addition to (before or after) the first peeling process of peeling off the coating with the first cutting edge in the longitudinal direction of the insulated conductive wire, a second peeling process of peeling off the coating of a side surface of the insulated conductive wire by moving a second cutting edge relatively to the insulated conductive wire in a direction perpendicular to the longitudinal direction thereof. As a result, the coating all around the outer circumference of the insulated conductive wire at the peeling region may be completely peeled off.

Preferably, a width length of the second cutting edge corresponds to a length of the peeling region in a longitudinal direction of the insulated conductive wire. This makes it possible to peel off the coating along the peeling region in a longitudinal direction of the insulated conductive wire at one time cutting operation of the second cutting edge.

Further, it is preferable from effective and precise cutting processing standpoints that the coating of opposite side surfaces of the insulated conductive wire is simultaneously peeled off by a pair of the second cutting edges.

In place of the second peeling process mentioned above, the first peeling process by the first cutting edge may be repeated over entire surfaces at the peeling region of the insulated conductive wire. It is more effective to make two of the first cutting edges move toward the groove formed near in a longitudinal center of the peeling region from the opposite ends thereof. Preferably, the groove is formed all around a circumference of the insulated conductive wire for easily removing cutting chips from the conductor. A trapezoidal shape of the groove is preferable for easy removal of the cutting chips. The groove may be also used for easily dividing the insulated conductive wire into a piece after peeling off all coatings at the peeling region.

In case of the insulated conductive wire having a near square cross section, the coating may be peeled off by moving cutting tools relatively to the insulated conductive wire in parallel with the respective flat faces and perpendicularly to a longitudinal direction of the insulated conductive wire, while making the respective cutting tools cut deep into the conductor through the coating. It is preferable to use a pair of cutting edges for peeling off the coating on any two flat surfaces in opposite angle directions thereof.

To completely peel off the coating all around the circumference of the conductor, preferably, the coating on any one of corners between the adjacent two flat surfaces of the insulated conductive wire may be peeled off by moving the cutting tools perpendicularly to the longitudinal direction of the insulated conductive wire. This results in making the cross section of the insulated conductive wire form in an octagonal shape.

It is an another aspect of the present invention to provide a method of peeling off the coating by grinding. The coatings at the peeling region on any one corner surface of the four corner surfaces and on adjacent any two side surfaces of the four side surfaces is simultaneously peeled off by making the corner surface and the adjacent any two side surfaces come in contact with a grinding stone whose grinding surface has a profile corresponding to shapes of the any one corner surface and the adjacent two any side surfaces and moving the insulated conductive wire relatively to the grinding stone in a longitudinal direction thereof. According to this grinding method, the coating on the round corner surface may be completely peeled off.

By adjusting a rotating speed of the grinding stone and a roughness of the grinding surface thereof, the conductor at the peeling region may have a plurality of linear scratches extending in a longitudinal direction of the insulated conductive wire or a satin finished surface having a plurality of fine concave and convex portions after the coating peeling process. With the satin finished surface at the peeling region, two of the insulated conductive wires may be easily bonded to each other and the linear scratches serve to make the insulating resin flow smoothly. The insulating resin is generally used for protecting the insulated conductive wires after bonding thereof.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 1A1 is a view of an insulated conductive wire before peeling according to a first embodiment of the present invention;

FIG. 1A2 is a cross sectional view taken along a line IA2—IA2 of FIG. 1A1;

FIG. 1B1 is a view of the insulated conductive wire in a first peeling process according to the first embodiment of the present invention;

FIG. 1B2 is a cross sectional view taken along a line IB2—IB2 of FIG. 1B1;

FIG. 1C1 is a view of the insulated conductive wire in a groove forming process according to the first embodiment of the present invention;

FIG. 1C2 is a cross sectional view taken along a line IC2—IC2 of FIG. 1C1;

FIG. 1D1 is a view of the insulated conductive wire in a second peeling process according to the first embodiment of the present invention;

FIG. 1D2 is a cross sectional view taken along a line ID2—ID2 of FIG. 1D1;

FIG. 1E1 is a view of the insulated conductive wire divided into a piece by cutting according to the first embodiment of the present invention;

FIG. 1E2 is a view of the insulated conductive wire as viewed from a line IE2—IE2 side of FIG. 1E1;

FIG. 8A1 is a view of an elliptical cross sectional insulated conductive wire before peeling according to a third embodiment of the present invention;

FIG. 8A2 is a cross sectional view taken along a line VIIIA2—VIIIA2 of FIG. 8A1;

FIG. 8B1 is a view of the insulated conductive wire having a cross section formed in a near square shape according to the third embodiment of the present invention;

FIG. 8B2 is a cross sectional view taken along a line VIIIB2—VIIIB2 of FIG. 8B1;

FIG. 8C1 is a view of the insulated conductive wire in a first peeling process according to the third embodiment of the present invention;

FIG. 8C2 is a cross sectional view taken along a line VIIIC2—VIIIC2 of FIG. 8C1;

FIG. 8D1 is a view of the insulated conductive wire in a second peeling process according to the third embodiment of the present invention;

FIG. 8D2 is a cross sectional view taken along a line VIIID2—VIIID2 of FIG. 8D1;

FIG. 8E is a view of the insulated conductive wire divided into a piece by cutting according to the third embodiment of the present invention;

FIG. 9 is a partly enlarged cross sectional view of the insulated conductive wire and a cutting tool in the first peeling process according to the third embodiment of the present invention;

DETAILED DESCRIPTION OF THE PREFERRED EMBODIMENTS

A first preferred embodiment of the present invention is described hereinafter according to FIGS. 1A1 to 1E2, 2A, 2B, 3 and 4.

FIGS. 1A1 to 1E2 show a processing sequential steps of the method of peeling off a coating of an insulated conductive wire. FIGS. 1A1 and 1A2 show an insulated conductive wire 1 with an elliptical cross section constituted by a conductor 10 and a coating 11 covering around a circumference of the conductor 10. As a first peeling process for peeling off the coating, as shown in FIGS. 1B1 and 1B2, a cutting tool 2 moves relatively to the insulated conductive wire 1 in parallel with a longer diameter direction of the elliptical cross section thereof to cut the insulated conductive wire 1 at a longitudinal predetermined position thereof so that the coating 11 and a part of the conductor 10 on opposite sides of the insulated conductive wire 1 in a shorter diameter direction of the elliptical cross section thereof may be removed.

Figure 2A:
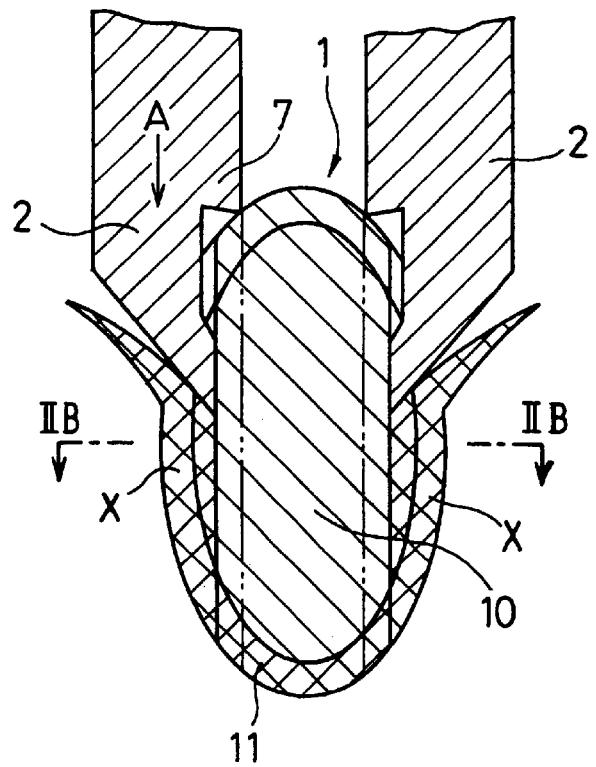
FIG. 2A is a partly enlarged cross sectional view of the insulated conductive wire and a cutting tool in a first peeling process according to the first embodiment of the present invention.
Figure 2B:
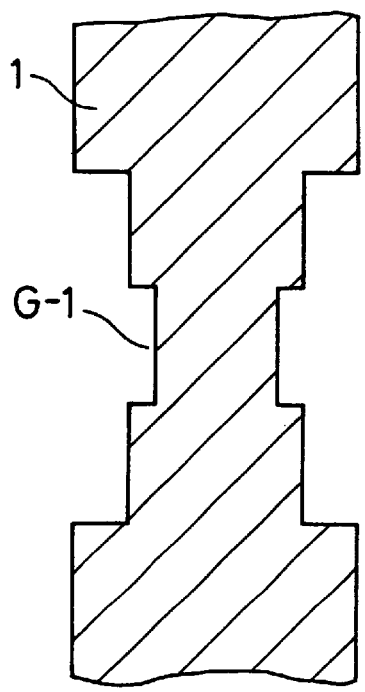
FIG. 2B is a cross sectional view of the insulated conductive wire taken along a line IIB—IIB of FIG. 2A after the first peeling process.

FIGS. 2A and 2B show a partly enlarged cross sectional view of the insulated conductive wire 1 and the cutting tool 2 in the first peeling process. Meshed portions illustrated in FIGS., 1A1, 1A2, 2A and 2B show portions X removed by the first peeling process. A width length of the cutting tool 2 corresponds to a length of a peeling region in a longitudinal direction of the insulated wire 1 where the coating 11 is peeled off. The portions X illustrated in FIGS., 1A1, 1A2, 2A and 2B are simultaneously removed by a pair of the cutting tools 2, 2. As a result, removal of the coating may be realized with less number of peeling processes.

The cutting tool 2 shown in FIG. 2A is provided integrally with a groove cutting edge 7 at a position backward apart from a leading end thereof. FIG. 2B shows a cross section of the insulated conductive wire 1 taken along a line IIB—IIB in FIG. 2A after forming a groove G-1 by the cutting tool 2. It is not always necessary to have the groove G-1 for peeling off the coating. Therefore, FIGS. 1B1 and 1B2 show a peeling process by the cutting tool not having the groove cutting edge 7.

Next, as shown in FIGS. 1C1 and 1C2, a groove Y is formed about at a center portion of the peeling region and on opposite sides of the insulated conductive wire 1 in a longer diameter direction of the elliptical cross section thereof. Meshed portions illustrated in FIGS. 1C1 and 1C2 show portions Y removed through the groove forming process.

Figure 3:
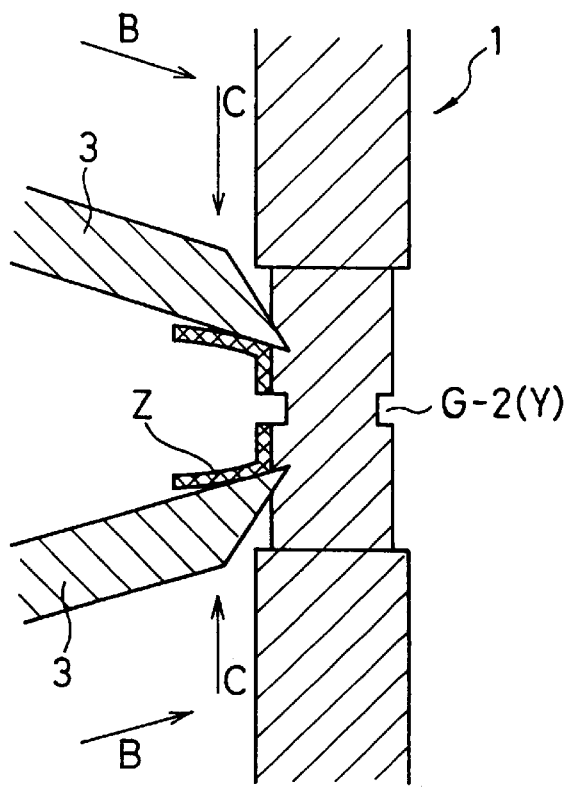
FIG. 3 is a partly enlarged cross sectional view of the insulated conductive wire and an another cutting tool in a second peeling process according to the first embodiment of the present invention.
Figure 4:
FIG. 4 is a perspective view of a cutting edge of the another cutting tool in the second peeling process according to the first embodiment of the present invention.

Then, as shown in FIG. 4, a remaining coating not peeled during the first peeling process is removed by a cutting tool 3 having a cutting profile of an arc shaped cutting edge analogous to an outline shape of the remaining coating. In more detail, the cutting tool 3 is moved, as shown in FIG. 3, in a direction shown by an arrow B, that is, obliquely in a longitudinal direction of the insulated conductive wire 1 so that the cutting edge of the cutting tool 3 may be cut into the insulated conductive wire 1. Then, the cutting tool 3 is moved in a direction shown by an arrow C that is the longitudinal direction of the insulated conductive wire 1 to remove by cutting the remaining coating and a part of the conductor. This is a second peeling process shown in FIGS. 1D1 and 1D2 and portions Z removed during the second peeling process are shown as meshed portions in FIGS. 1D1 and 1D2. The process sequence may be changed so as to execute the first peeling process after the second peeling process.

Figure 14:
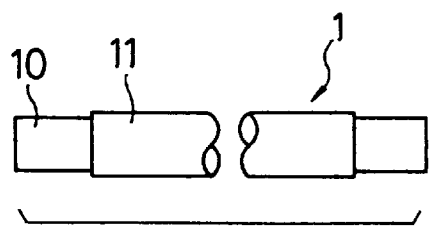
FIG. 14 is a view of a divided piece of the insulated conductive wire, on opposite sides of which the coating is peeled off.

The insulated conductive wire 1, after the first and second peeling processes, is divided into a piece by a cutting tool 4, as shown in FIGS. 1E1 and 1E2. FIG. 14 shows a divided piece of the insulated conductive wire 1, on opposite sides of which the coating is peeled off.

With the method of peeling off the coating of the insulated conductive wire according to the first embodiment of the present invention, the coating may be completely and reliably peeled off because of the cutting processing mentioned above. Further, an adequate selection of the shape and dimension of the cutting tool may prevent the conductor from becoming too thin.

Furthermore, at the second peeling process, as the cutting tool is moved in the longitudinal direction of the insulated conductive wire and the cutting profile of the cutting tool corresponds to a cross sectional outline shape of the insulated conductive wire, the coating may be effectively removed.

Moreover, as the groove is formed before the second peeling process, cutting bars or chips at the second peeling process may be easily removed. Further, as the cutting profile of the cutting edge to be used in the second peeling process is formed in the arc shape, the coating may be removed by a simple construction for moving the cutting tool.

Next, a method of peeling off the coating of the insulated conductive wire according to a second embodiment is described. According to the first embodiment, the groove G-2 (the portions Y in FIGS. 1C1 and 1C2) is formed on the opposite sides of the insulated conductive wire in the longer diameter direction of the elliptical cross section thereof. However, according to the second embodiment, a groove G-3 is formed all around a circumference of the insulated conductive wire. In a case that the groove G-2 is formed on the opposite sides of the insulated conductive wire in the longer diameter direction of the elliptical cross section thereof, as shown in the first embodiment, there is a possibility that the cutting bars can not be easily removed from the insulating conductive wire even if the cutting tool 3 moves in the longitudinal direction (feed direction) of the insulated conductive wire and reaches the groove G-2 for removing the coating and a surface part of the conductor. This is due to a reason that both ends of the arc shaped cutting edge of the cutting tool 3 cut deeper into the conductor than a depth of the groove G-2 because of the processing fluctuation and the like and the cutting bars can not be separated from the conductor on a bottom surface of the groove.

Further, when the cutting edge of the cutting tool cuts only into a portion relatively shallow from an outer surface of the insulated conductive wire, there is a risk that the coating can not be peeled off sufficiently.

On the other hand, the groove G-3 all around the circumference of the insulated conductive wire according to the second embodiment serves to separate the cutting bars from the conductor when the cutting edge reaches the groove, even if the both ends of the cutting edge cut relatively deep into the conductor. As a result, relatively large amounts of the coating and a part of the conductor are removed so that insufficient peeling of the coating may be prevented.

Figure 5:
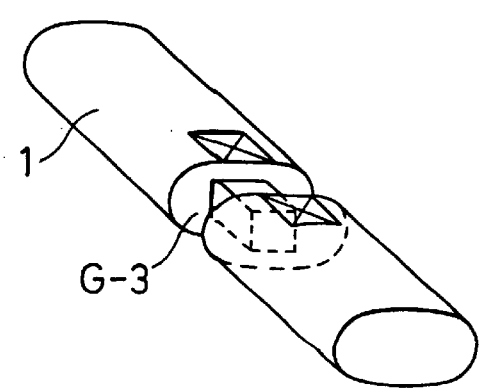
FIG. 5 is a perspective view of an insulated conductive wire in which a groove is formed around the outer circumference thereof by a method according to a second embodiment of the present invention.

FIG. 5 shows a perspective view of the insulated conductive wire in which the groove G-3 is formed around the outer circumference thereof according to the second embodiment. Detail processes of forming the groove G-3 according to the second embodiment are shown in FIGS. 6A to 6C, 7A and 7B. According to the second embodiment, a coating peeling and a groove forming in a longer diameter direction of the elliptical cross section of the insulated conductive wire are processed in use of a pair of punches A and B and a die 6 that are cutting tool. And, a groove forming on opposite sides of the insulated conductive wire in the longer diameter direction of the elliptical cross section thereof is processed in use of another pair of punches C and D that are cutting tool.

Each of the pair of punches A and B is provided with a groove cutting edge 7 for forming the groove G-3. Further, the punch A is provided with a hole 8 through which the pair of punches C and D can penetrate and the punch B is provided with two holes 9 and a bridging portion 12 serving as a die between the two holes 9. The punches C and D can penetrate through the two holes 9, respectively.

Figure 6A:
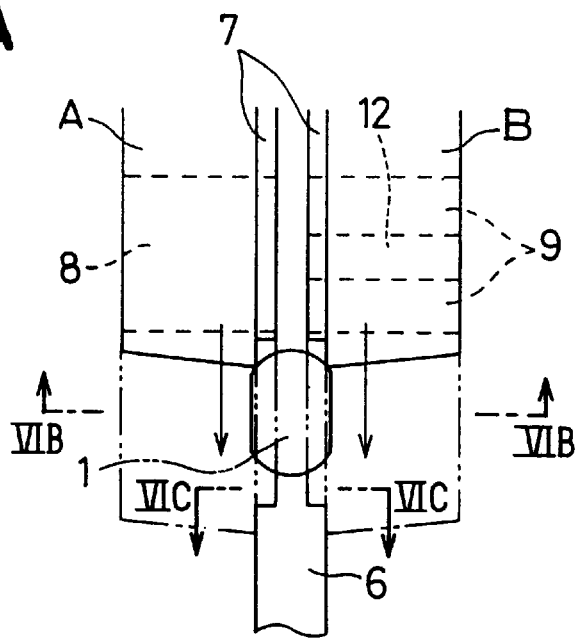
FIG. 6A is a view showing a method in which a coat peeling and a groove forming in a longer diameter direction of a cross section of the insulated conductive wire are processed by a pair of punches and a die according to the second embodiment of the present invention.
Figure 6B:
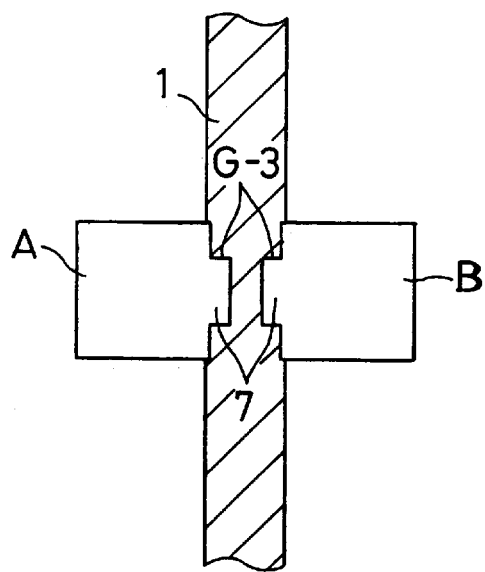
FIG. 6B is a cross sectional view taken along a line VIB—VIB of FIG. 6A.
Figure 6C:
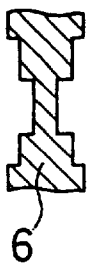
FIG. 6C is a cross sectional view of the die taken along a line VIC—VIC of FIG. 6A.
Figure 7A:
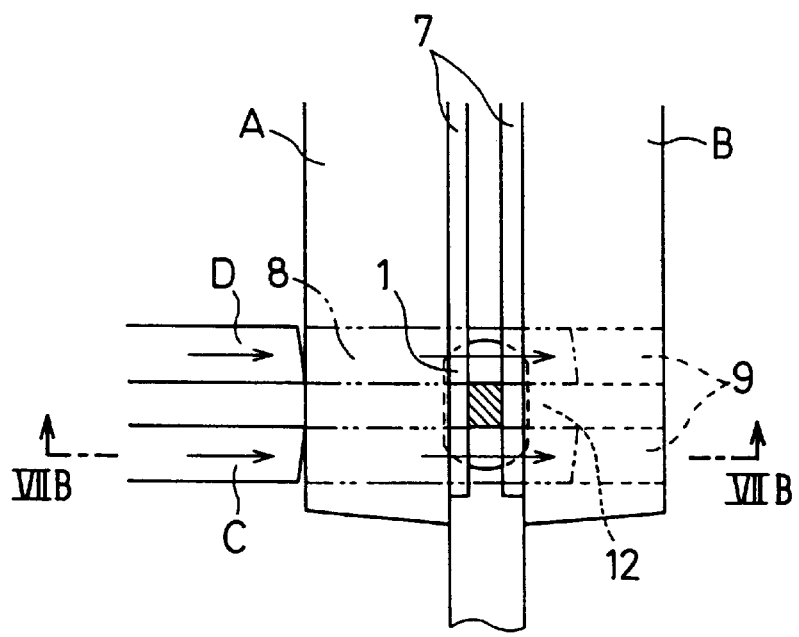
FIG. 7A is a view showing a method in which a coat peeling in a shorter diameter direction of the cross section of the insulated conductive wire are processed by an another pair of punches according to the second embodiment of the present invention.
Figure 7B:
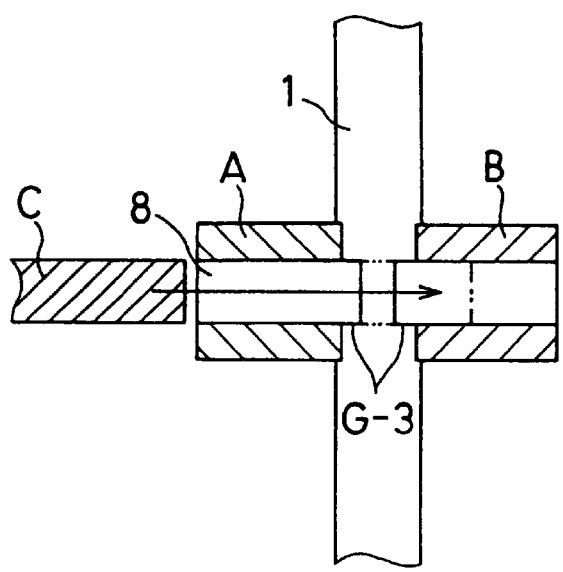
FIG. 7B is a cross sectional view taken along a line VIIB—VIIB of FIG. 7A.

FIG. 6C shows a cross sectional view of the die 6.

Next, as a first step of process sequences, the die 6 supports the insulated conductive wire 1. Next, the pair of punches A and B moves toward the die 6, as shown in FIG. 6A. That is, the punches A and B move perpendicularly to the feed direction of the insulated conductive wire 1 so that the coating peeling and the groove formation on the insulated conductive wire 1 in the longer diameter direction of the elliptical cross section thereof may be simultaneously implemented.

The groove cutting edges 7 provided at the punches A and B reach the insulated conductive wire 1 after the cutting edges for peeling off the coating provided at the punches A and B reach the insulated conductive wire 1. Since the amount to be removed for the groove forming is larger than that for the coating peeling and the stress applied to the insulated conductive wire 1 in case of the groove forming is larger than that in case of the coating peeling, the groove is formed at a state that the opposite sides of the insulated conductive wire are supported by the pair of the punches A and B constituting bases of the cutting edges for peeling off the coating. Without the support from the opposite sides mentioned above, the insulated conductive wire 1 is likely to deform when the groove is formed. The insulated conductive wire 1 is formed in a shape as shown in FIG. 6B by the punches A and B and the die 6.

Next, while keeping a state that the coating peeling and the groove forming have been finished, as shown in FIGS. 6A to 6C, the bunches C and D move. The punches C and D pass through the hole 8 of the punch A, cut off the coating and a part of the conductor of the insulated conductive wire 1, and, further, pass through the holes 9 of the punch B so that the opposite end portions of the insulated conductive wire 1 in the longer diameter direction of the elliptical cross section may be cut off with a help of the bridging portion 12 acting as the die. As a result, the insulated conductive wire 1 with the groove G-3 around the outer circumference thereof may be formed as shown In FIG. 5.

As the groove of the opposite end portions in the longer diameter direction mentioned above is formed by inserting the punches C and D into the holes 8 and 9, while keeping a state that the punches A and B support the insulated conductive wire, the insulated conductive wire does not deform.

Then, after dismounting the insulated conductive wire from the punches A, B, C and D and the die 6, coating peeling along a shorter direction of the elliptical cross section is processed by moving another cutting tool in the feed direction of the insulated conductive wire so that the coating all around the outer circumference thereof at the peeling region may be completely removed.

According to the second embodiment, one time movement of the punches A and B to the die 6 makes it possible not only to peel off the coating but also to form the groove, as mentioned before. Though the cross section of the groove is formed in a near square shape according to the second embodiment, the cross section may be formed in a trapezoid shape by changing a shape of the groove cutting edge. The trapezoid shaped groove serves to cut apart from the conductor more easily.

Further, as a modification of the second embodiment, it is possible to have a process that, at first, only a groove is formed all around the outer circumference of the insulated conductive wire perpendicularly to a longitudinal direction of the insulated conductive wire and, then, a cutting tool is moved toward the groove in the longitudinal direction of the insulated conductive wire. The longitudinal direction movement of the cutting tool are repeated by a plurality of times to peel off the coating at a predetermined region around the outer circumference of the insulated conductive wire.

FIGS. 8A1 to 8E show processing sequential steps of a method of peeling off a coating of an insulated conductive wire according to a third embodiment of the present invention.

According to the third embodiment, a cross sectional shape of the insulated conductive wire is deformed from an elliptical shape to a near square shape before peeling off the coating. That is, in an elliptical cross sectional insulated conductive wire 1 having a conductor 10 and a coating 11 covering around an outer circumference of the conductor, as shown in FIGS. 8A1 and 8A2, the cross sectional shape of the insulated conductive wire 1 at least at a predetermined portion where the coating is to be peeled off is formed in the near square shape by pressing, as shown in FIGS. 8B1 and 8B2. The forming to the near square shaped cross section may be implemented before covering around the circumference of the conductor 10 with the coating 11.

Then, a movement of a pair of cutting edges of a cutting tool 2 in parallel with a longer diameter direction of the elliptical cross section (square shaped cross section) and perpendicular to a longitudinal direction of the insulated conductive wire cuts off a part of the insulated conductive wire to peel off the coating thereon so that two surfaces in parallel with each other may be formed, as shown as an enlarged view thereof in FIG. 9. This is a first peeling process and the insulated conductive wire 1 after the first peeling process is shown in FIGS. 8C1 and 8C2.

Next, a movement of a pair of cutting edges of another cutting tool (not shown) similar to the cutting tool 2 in parallel with a shorter diameter direction of the elliptical cross section (square shaped cross section) and perpendicular to a longitudinal direction of the insulated conductive wire cuts off another part of the insulated conductive wire to peel off the coating thereon so that another two surfaces perpendicular to the two surfaces formed by the first peeling process may be formed. This is a second peeling process and the insulated conductive wire 1 after the second peeling process is shown in FIGS. 8D1 and 8D2.

Finally, after the first and second peeling processes, the insulated conductive wire is divided into a piece by a cutting tool 4, as shown in FIG. 8E. The divided piece of the insulated conductive wire 1, on opposite sides of which the coating is peeled off, is shown in FIG. 14.

According to the method of the third embodiment, the insulated conductive wire is deformed in advance in the near square shaped cross section at least at the predetermined peeling portion and the cutting process is implemented only twice perpendicularly to the longitudinal direction of the insulated conductive wire. As a result, the coating may be effectively and reliably peeled off.

Next, a method of peeling off a coating of an insulated conductive wire according to a fourth embodiment of the present invention is described.

The method according to the fourth embodiment is a modification or an improvement of the method according to the third embodiment. According to the third embodiment, four side surfaces of the square shaped cross sectional insulated conductive wire are cut off to remove the coating. However, there is a possibility that mere the four side surface cutting causes residual coatings on corners among the four side surfaces, since each of the corners has a R portion rounded with a predetermined curvature.

Therefore, according to the fourth embodiment, the coating of each of four corners is peeled off by moving a cutting tool edge perpendicularly to the longitudinal direction of the insulated conductive wire so that the insulated conductive wire may be formed in a nearly octagonal cross section. As a result, the coating all around the outer circumference of the insulated conductive wire at the peeling region may be completely peeled off. The nearly octagonal cross section serves not to form an extremely small cross sectional area of the insulated conductive wire.

FIGS. 10A to 13B show processing steps of the method according to the fourth embodiment. Before peeling off the coating on the four side surfaces, the coatings on the corners are peeled off. FIGS. 10A, 10B, 11A and 11B illustrate corner peeling processes (1) and (2) in which the corners of the elliptical (square shaped with R portion) cross sectional insulated conductive wire are removed by moving punches in a direction inclined, for example. by an angle of 45°, to the insulated conductive wire.

Figure 10A:
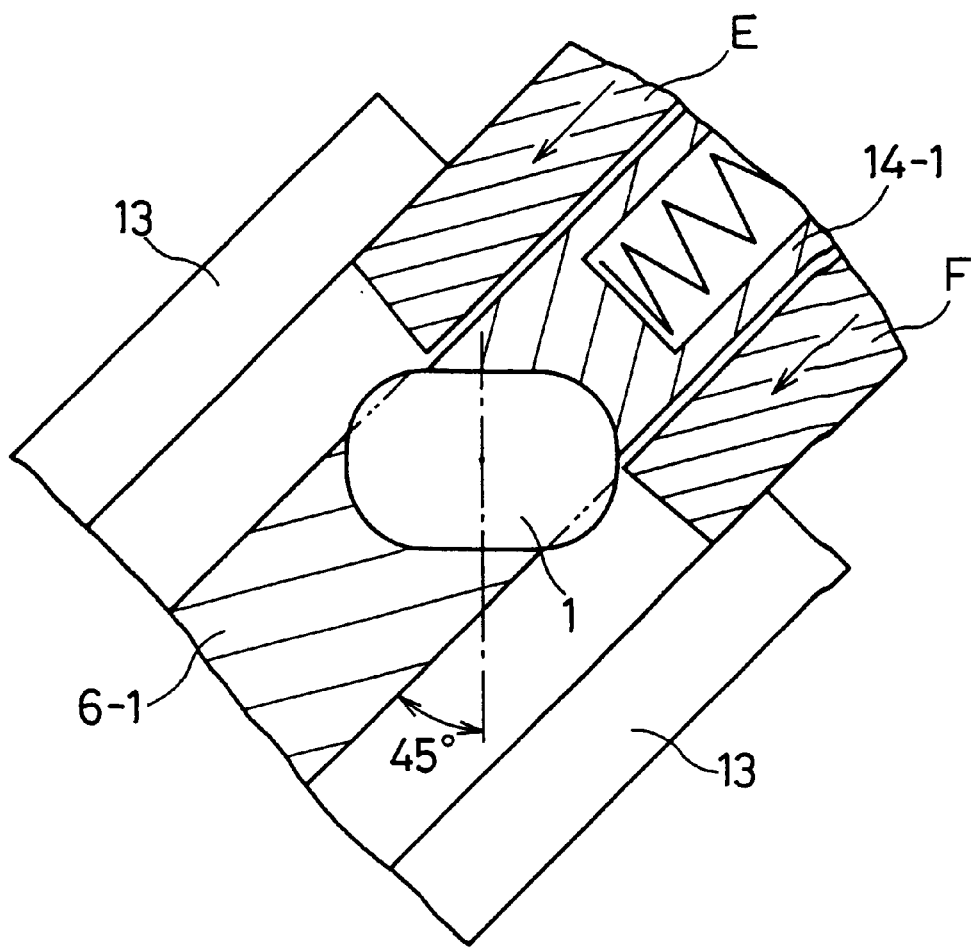
FIG. 10A is a view showing a first corner peeling process for the near square shaped cross sectional insulated conductive wire according to a fourth embodiment of the present invention.
Figure 10B:
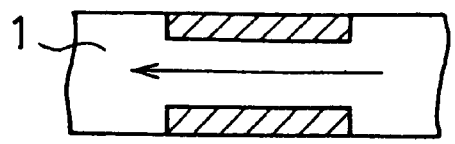
FIG. 10B is a plan view of the near square shaped cross sectional insulated conductive wire after the first corner peeling process according to the fourth embodiment of the present invention.

In the corner peeling process shown in FIG. 10A, a die 6-1 is arranged at an inclined angle, about an angle of 45°, to a longer diameter direction of the cross section of the insulated conductive wire. The die 6-1 supports the insulated conductive wire and is provided with an edge for separating chips or bars to have been cut from the insulated conductive wire. The cross sectional shape of the die 6-1 is analogous to the cross sectional shape of the insulated conductive wire, as far as a portion for supporting the insulated conductive wire is concerned. A pair of punches E and F, that are cutting tool for cutting the insulated conductive wire, are arranged also at an about 45° angle to the longer diameter direction of the cross section of the insulated conductive wire. Further, a guide 13 is provided for supporting the punches E and F not to bend in radial direction during the cutting processing thereof and a stopper 14-1 is provided for supporting the insulated conductive wire not to move during the cutting processing thereof. The cross sectional shape of the stopper 14-1 is analogous to the cross sectional shape of the insulated conductive wire and the stopper 14-1 urges the insulated conductive wire toward the die 6-1 by a spring. A cutting edge angle of each of the punches E and F is, for example, 0 to 10°.

With the construction mentioned above, the pair of punches E and F move straightly along the guide 13 with about 45° angle mentioned above so that two opposing corners of the insulated conductive wire 1 may be cut off.

Figure 11A:
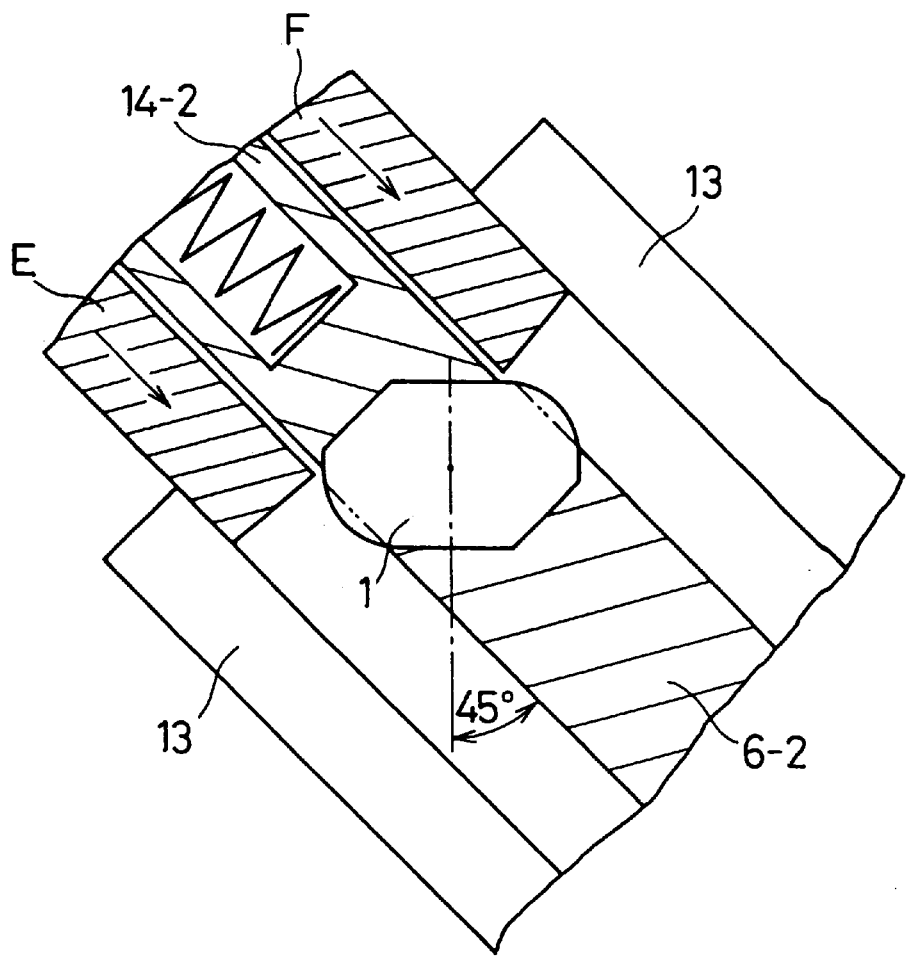
FIG. 11A is a view showing a second corner peeling process for the near square shaped cross sectional insulated conductive wire according to the fourth embodiment of the present invention.
Figure 11B:
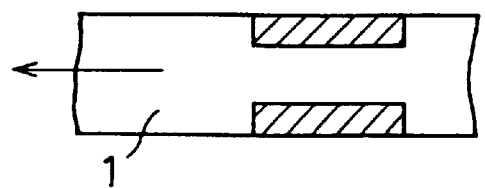
FIG. 11B is a plan view of the near square shaped cross sectional insulated conductive wire after the second corner peeling process according to the fourth embodiment of the present invention.

Next, in the corner peeling process (2) shown in FIG. 11A, a pair of punches E and F, a die 6-2 and a stopper 14-2 are arranged with 90° phase difference, compared with those of the corner peeling process (1). Each of the cross sections of the die 6-2 and the stopper 14-2, as far as the portions for respectively supporting the insulated conductive wire are concerned, is formed in a shape corresponding to a cross section of the insulated conductive wire whose corners are cut off in the corner peeling process (1). A gap between the leading ends of the punch E or F and the die 6-2 is so small that chips or bars may be completely removed, as in the corner peeling process (1). The pair of punches E and F move straightly along the guide 13 with about 45° angle mentioned above so that remaining two opposing corners of the insulated conductive wire 1 may be cut off, similarly to the corner peeling process (1).

Figure 12A:
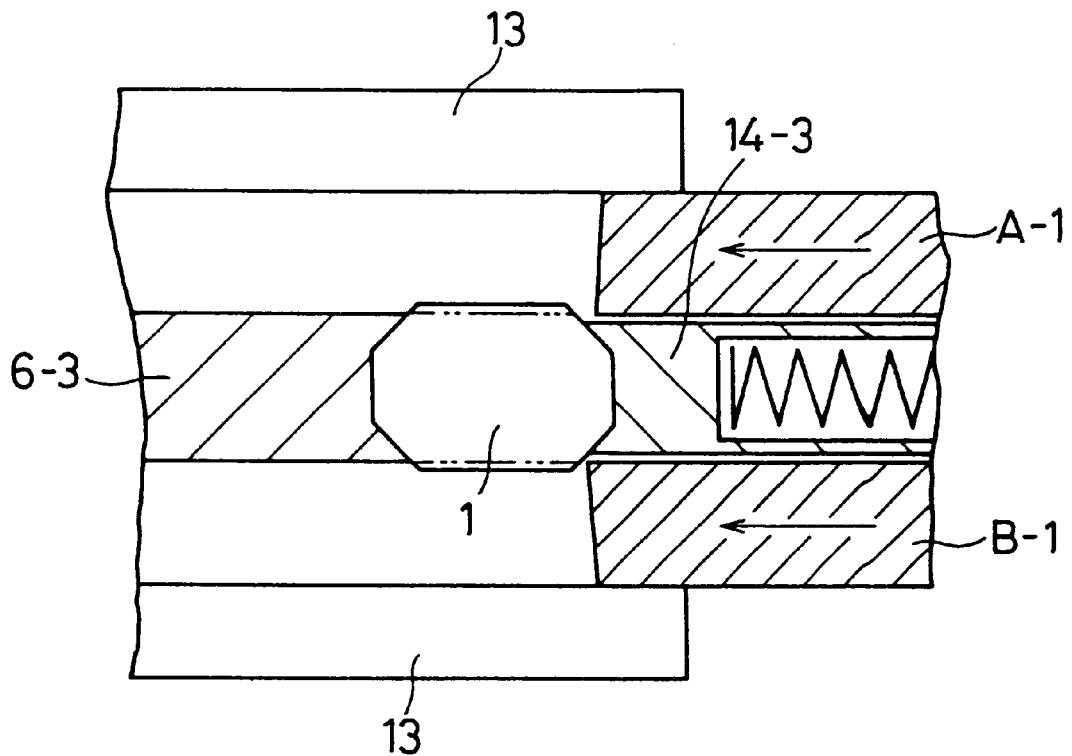
FIG. 12A is a view showing a first side surface peeling process for the near square shaped cross sectional insulated conductive wire according to the fourth embodiment of the present invention.
Figure 12B:
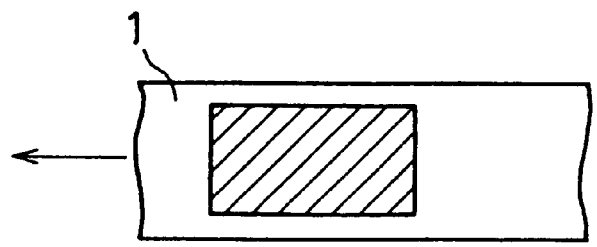
FIG. 12B is a plan view of the near square shaped cross sectional insulated conductive wire after the first side surface peeling process according to the fourth embodiment of the present invention.

Next, FIGS. 12A and 12B show a side surface peeling process (1). According to the side surface peeling process (1), opposite side surfaces of the insulated conductive wire, whose corners are cut off, in a shorter diameter direction of the cross section thereof are cut to peel off the coating. A pair of punches A-1 and B-1, a die 6-3, a guide 13 and a stopper 14-3 are so arranged respectively that the punches A-1 and B-1 moves in parallel with the longer diameter direction of the cross section of the insulated conductive wire and perpendicularly to the longitudinal direction of the insulated conductive wire along the guide 13. Each of the cross sections of the die 6-3 and the stopper 14-3, as far as the portions for respectively supporting the insulated conductive wire are concerned, is formed in a shape corresponding to a cross section of the insulated conductive wire whose corners are cut off in the corner peeling processes (1) and (2). The movement of the punches A-1 and B-1 along the guide 13 peels off the coating on opposite side surfaces of the insulated conductive surface in a shorter diameter direction of the cross section thereof.

As the die 6-3 and the stopper 14-3 support letter V shaped cross sectional portions of the insulated conductive wire formed by cutting off the four corners, the insulated conductive wire may be accurately positioned relatively to the die 6-3 and the punches A-1 and B-1. As a result, the coating peeling on the side surfaces may be carried out with high accuracy so as to prevent a residual coating at the peeling region.

Figure 13A:
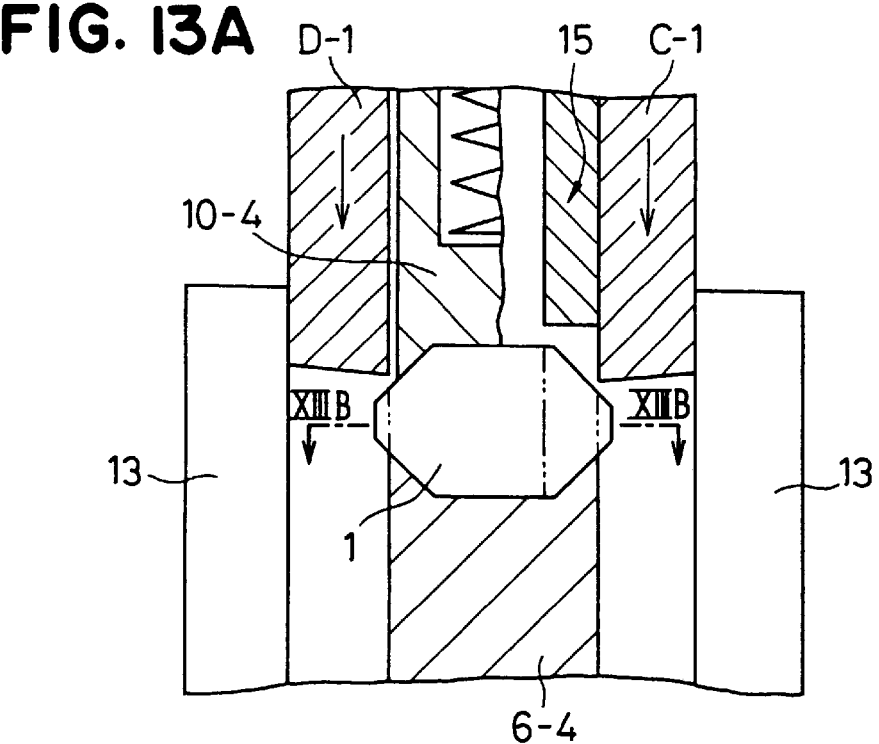
FIG. 13A is a view showing a second side surface peeling process for the near square shaped cross sectional insulated conductive wire according to the fourth embodiment of the present invention.
Figure 13B:
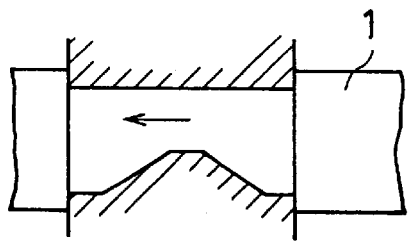
FIG. 13B is a plan view of the near square shaped cross sectional insulated conductive wire after the first side surface peeling process according to the fourth embodiment of the present invention.

In a side surface peeling process (2) shown in FIGS. 13A and 13B, opposite side surfaces of the insulated conductive wire, whose four corners and opposite side surfaces in a shorter diameter direction of the cross section thereof are already cut off, in a longer diameter direction of the cross section thereof are cut to peel off the coating. A pair of punches C-1 and D-1, a die 6-4, a guide 13 and a stopper 14-4 are so arranged respectively that the punches C-1 and D-1 moves in parallel with the shorter diameter direction of the cross section of the insulated conductive wire and perpendicularly to the longitudinal direction of the insulated conductive wire along the guide 13. Each of the cross sections of the die 6-4 and the stopper 14-4 is formed in a shape corresponding to a cross section of the insulated conductive wire whose corners are cut off in the corner peeling processes (1) and (2) and the side surface peeling process (1). With the construction mentioned above, the coating peeling on the another side surfaces may be carried out with high accuracy so as to prevent a residual coating at the peeling region under the same reason as mentioned before.

The movement of the punches C-1 and D-1 along the guide 13 peels off the coating on opposite another side surfaces of the insulated conductive surface in a longer diameter direction of the cross section thereof.

At least one of the punches C-1 and D-1 may be provided with a face cut punch 15, as shown in FIG. 13A. The face cut punch 15 is formed integrally with the punch C-1 or D-1 at a position backward apart from a leading end of the punch C-1 or D-1. With the face cut punch 15, at least one of the opposite another side faces of the insulated conductive wire in the longer diameter direction thereof may be cut, as shown in FIG. 13B, by one stroke of the punch C-1 or D-1 at a timing after the coating on that surface is peeled off in advance. The face cut punch 15 is provided for the purpose of reducing cutting bars to be formed when the insulated conductive wire is divided into a piece by cutting after the peeling processes. In another words, as smaller is a cross sectional area of a portion where the insulated conductive wire is divided into a piece, the cutting bars are less formed. The divided piece of the insulated conductive wire, on opposite sides of which the coating is peeled off, is shown in FIG. 14.

As described in FIGS. 10A to 13B, in each of the corner peeling processes (1) and (2) and the side surface peeling processes (1) and (2) according to the fourth embodiment, the opposing corners and the opposite side surfaces are cut off simultaneously by the pair of punches. The side surface peeling processes (1) and (2) may be implemented before the corner peeling processes (1) and (2).

The near square shape of the cross section of the insulated conductive wire includes a shape whose corners are rounded or whose side portion is curved or is constituted by a plurality of lines inclined to each other.

Figure 15A:
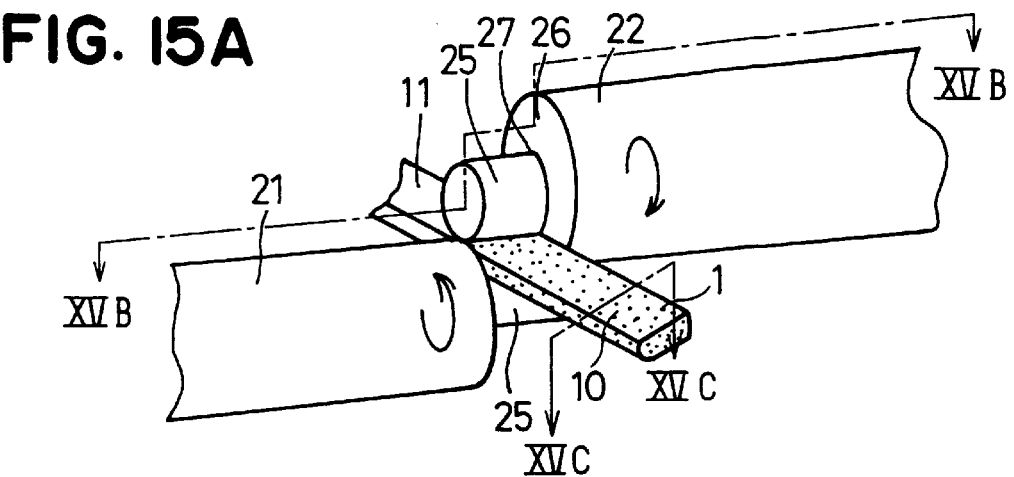
FIG. 15A is a perspective view showing a state that a pair of grinding stones peel off coatings of four side surfaces and a pair of opposing corners of a near square shaped cross sectional insulated conductive wire according to a fifth embodiment of the present invention.
Figure 15B:
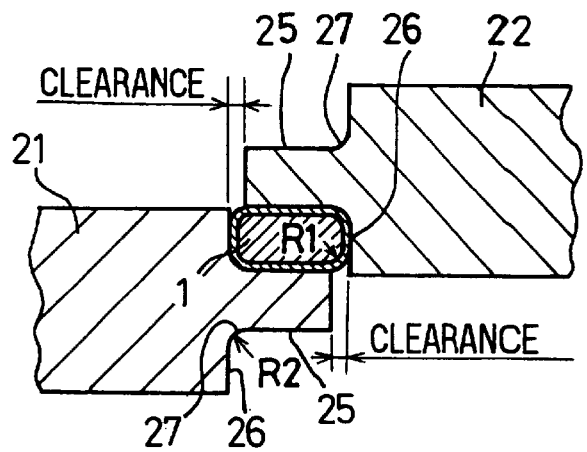
FIG. 15B is a cross sectional view taken along a line XVB—XVB of FIG. 15A.
Figure 15C:
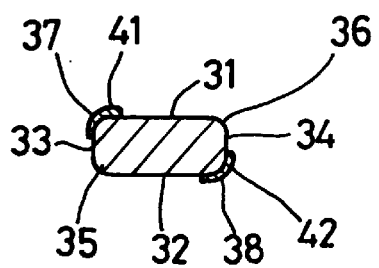
FIG. 15C is a cross sectional view taken along a line XVC—XVC of FIG. 15A.
Figure 16:
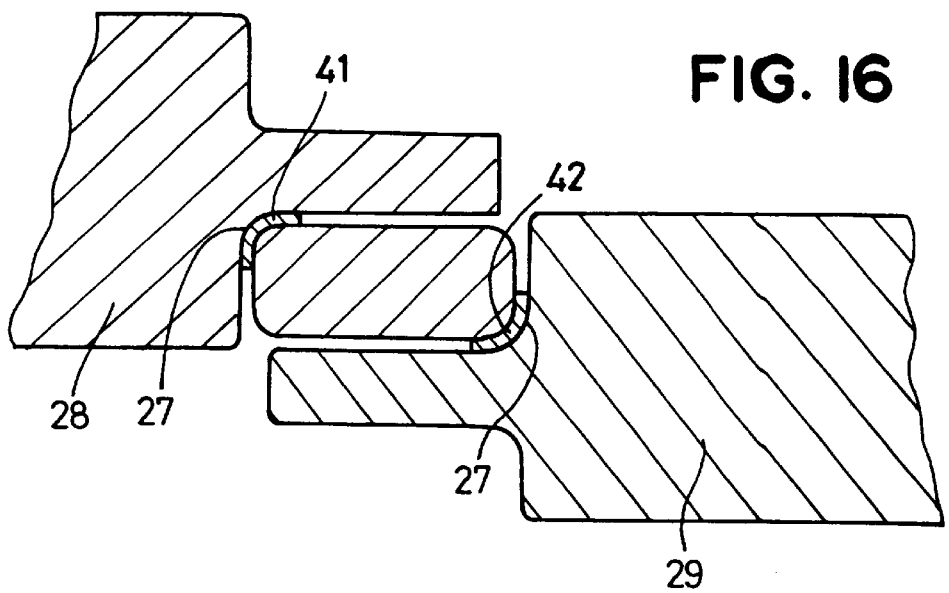
FIG. 16 is a schematic cross sectional view showing a state that another pair of grinding stones peel off a coating of an another pair of corners of the near square shaped cross sectional insulated conductive wire according to the fifth embodiment of the present invention.

A method of peeling off a coating of an insulated conductive wire according to a fifth embodiment of the present invention is described with reference to FIGS. 15A to 15C and 16. FIG. 15A is a perspective view showing a state that a pair of grinding stones peel off coatings on four side surfaces and a pair of opposing corners of a near square shaped cross sectional insulated conductive wire. FIG. 15B is a cross sectional view taken along a line XVB—XVB of FIG. 15A and FIG. 15C is a cross sectional view taken along a line XVC—XVC of FIG. 15A. FIG. 16 is a cross sectional view showing a state that another pair of grinding stones peel off a coating of an another pair of corners of the near square shaped cross sectional insulated conductive wire.

A pair of grinding stones 21 and 22 are rotatably supported by a base (not shown) and driven by a motor (not shown). The pair of the grinding stones 21 and 22, which are rotating at a predetermined speed, are arranged on opposite sides of an insulated conductive wire 1 so as to surround an outer circumference thereof. Each of the grinding stones 21 and 22 is provided with grinding portions (coming in contact with the outer surface of the insulated conductive wire 1) constituted by a column shaped surface 25 extending in an axial direction thereof, a disk shaped surface 26 extending in a radial direction thereof and a corn shaped surface 27 between the column shaped surface 25 and the disk shaped surface 26. The diameter of the corn shaped surface 27 becomes larger toward the disk shaped surface 26 from the column shaped surface 25.

The insulated conductive wire 1 has a pair of opposite side surfaces 31 and 32 in parallel with a longer diameter direction of the cross section thereof (in a width direction), an another pair of opposite side surfaces 33 and 34 perpendicular to the side surfaces 31 and 32 (in a thickness direction) and four corner surfaces 35, 36, 37 and 38, as shown in FIG. 15C.

A distance between the column shaped surfaces 25, 25 of the grinding stones 21 and 22 is slightly shorter than a thickness length of the insulated conductive wire 1, a distance between the disk shaped surfaces 26, 26 is slightly shorter than a width length of the insulated conductive wire 1 and a distance between the corn shaped surfaces 27, 27 is set to an extent that the corn shaped surfaces 27, 27 cut slightly into the corner surfaces 35 and 36, respectively. A curvature of each of the corn shaped surfaces 27, 27 nearly corresponds to that of each of the corner surfaces 35 to 38.

As a first peeling process shown in FIG. 15A, the insulated conductive wire 1 is inserted into the grinding stones 21 and 22 and moved in a longitudinal direction thereof relatively to the grinding stones 21 and 22 so that the coating 11 around the conductor 10 of the insulated conductive wire 1 except residual coatings 41 and 42 at the corner surfaces 37 and 38 may be removed by grinding and, thus, an outer surface of the conductor 10 may be exposed. When the grinding is carried out, the grinding surfaces of the grinding stones 21 and 22 may be urged toward the surface of the insulated conductive wire 1 by springs (not shown).

As mentioned above, the coatings 41 and 42 remain at the corner surfaces 37 and 38, as shown in FIG. 15C, because it is necessary to have a clearance between a leading end of the column surface 25 of the grinding stone 21 and the disk surface 26 of the grinding stone 22 and a clearance between a leading end of the column surface 25 of the grinding stone 22 and the disk surface 26 of the grinding stone 21, as shown in FIG. 15B.

Next, as a second peeling process, the insulated conductive wire 1 is inserted between a pair of grinding stones 28 and 29, as shown in FIG. 16.

The grinding stones 28 and 29 have the same shapes as the grinding stones 21 and 22 and are arranged to position differently from the grinding stones 21 and 22. And, the corn shaped surfaces 27, 27 come in contact with the residual coatings 41 and 42. As a result, the coating all around the circumference of the insulated conductive wire 1 may be peeled off at a region having a distance during which the insulated conductive wire 1 feeds or moves relatively to the respective grinding stones 21, 22, 28 and 29 in the longitudinal direction thereof.

According to the fifth embodiment, the outer surface of the conductor 10 is formed by grinding so as to become a satin finished surface having a plurality of fine concave and convex portions by adjusting roughness of the grinding surface and a rotating speed of each of the grinding stones 21 and 22. The finished surface as mentioned above helps to hold sufficiently molten solder and brazing material so that a bonding reliability of the peeled portion of the insulated conductive wire bonded to the other element may increase.

For adjusting wear of the grinding surfaces of the column shaped surfaces 25, 25 or the disk shaped surfaces 26, 26 of the rotating grinding stones 21 and 22, it may be possible to shorten a distance between the center axes of the grinding stones 21 and 22 or to move the grinding stones 21 and 22 in respective axial directions thereof.

According to the fifth embodiment, the coating 11 all around the outer circumference of the insulated conductive wire 1 is peeled off by two pairs of the grinding stones 21, 22, 28 and 29 and each pair of the grinding stones 21 and 22 or 28 and 29 are arranged relatively to the insulated conductive wire 1 in opposite angle directions, respectively. However, the residual coatings 41 and 42 may be peeled off, as the second peeling process, by the grinding stones 21 and 22 whose respective opposite angle positions relative to the insulated conductive wire 1 are shifted after the first peeling process.

Or, after the first peeling process, the insulated conductive wire 1 may be inserted between the grinding stones 21 and 22 again but from an opposite direction to an inserting direction in the first peeling process. Alternatively, the grinding stones 21, 22, 28 and 29 may be independently arranged relatively to the insulated conductive wire 1 in a longitudinal direction thereof to grind the side surfaces 31, 32, 33 and 34 including the corner surfaces 35, 36, 37 and 38 of the insulated conductive wire 1 sequentially one by one.

Figure 17:
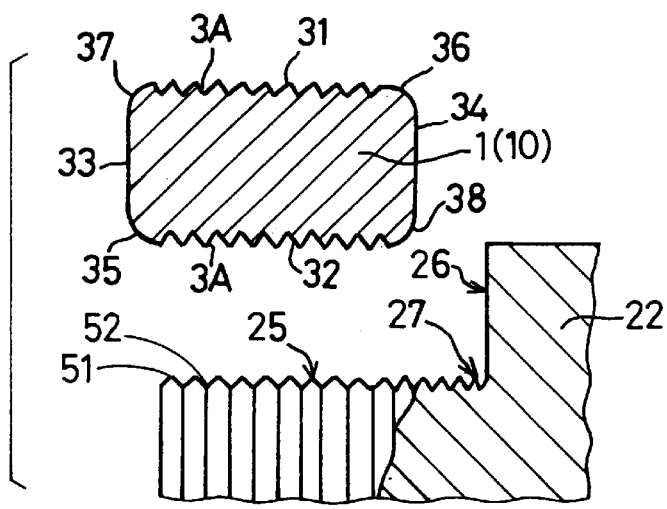
FIG. 17 is a schematic view of cross sections of an insulated conductive wire and a grinding stone according to a modification of the fifth embodiment of the present invention.

Next, a modification of the fifth embodiment is described with reference to FIG. 17. According to the modification mentioned above, the column shaped surface 25 of each of the grinding stones 21, 22, 28 and 29 are provided with a plurality of hill and dale portions 51 and 52, which are formed concentrically to a center axis of each of the grinding stones 21, 22, 28 and 29 with a given pitch in a longitudinal direction thereof.

With the hill and dale portions 51 and 52, the side surfaces 31 and 32 of the conductor 10 of the insulated conductive wire 1 is provided with a plurality of linear scratches 3A extending in a longitudinal direction thereof. After two leading ends of the peeling portions of the insulated conductive wires are bonded to each other, when the peeling portions are covered with insulating resin which is liquid originally or becomes liquid thereafter, the linear scratches 3A serve to make the insulating resin flow smoothly. In place of the hill and dale portions 51 and 52 formed in advance in the column surfaces 25, 25, according to this modification, high speed rotation of the grinding stone 21 or 22 having relatively rough grinding surfaces results in similar effect to that modification.

Figure 18:
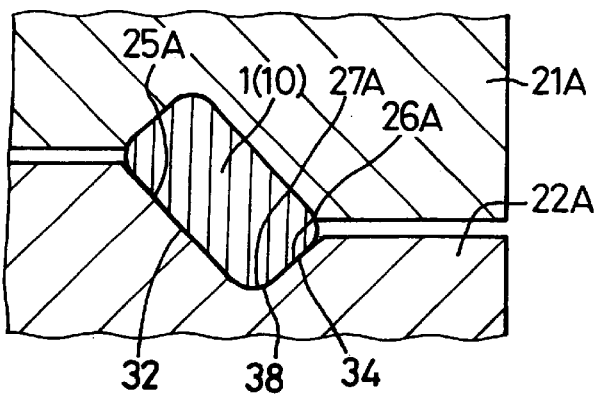
FIG. 18 is a schematic view of cross sections of an insulated conductive wire and a pair of grinding stones according to an another modification of the fifth embodiment of the present invention.

An another modification of the fifth embodiment is described with reference to FIG. 18. According to the another modification, respective angular positions of a column shaped surface 25A, a disk shaped surface 26A and a corn shaped surface 27A of each of grinding stones 21A and 22A to a center axis thereof are different from those according to the fifth embodiment. Not only same effect as disclosed in the fifth embodiment can be obtained, but also the compensation of wear of the grinding surface may be made just by adjusting a distance between the center axes of the grinding stones 21A and 22A. Respective offset wear of the grinding surfaces of the grinding stones may be cured by using an adjusting grinding stone.

Next, a method according to a sixth embodiment of the present embodiment is described with reference to FIG. 19.

Figure 19:
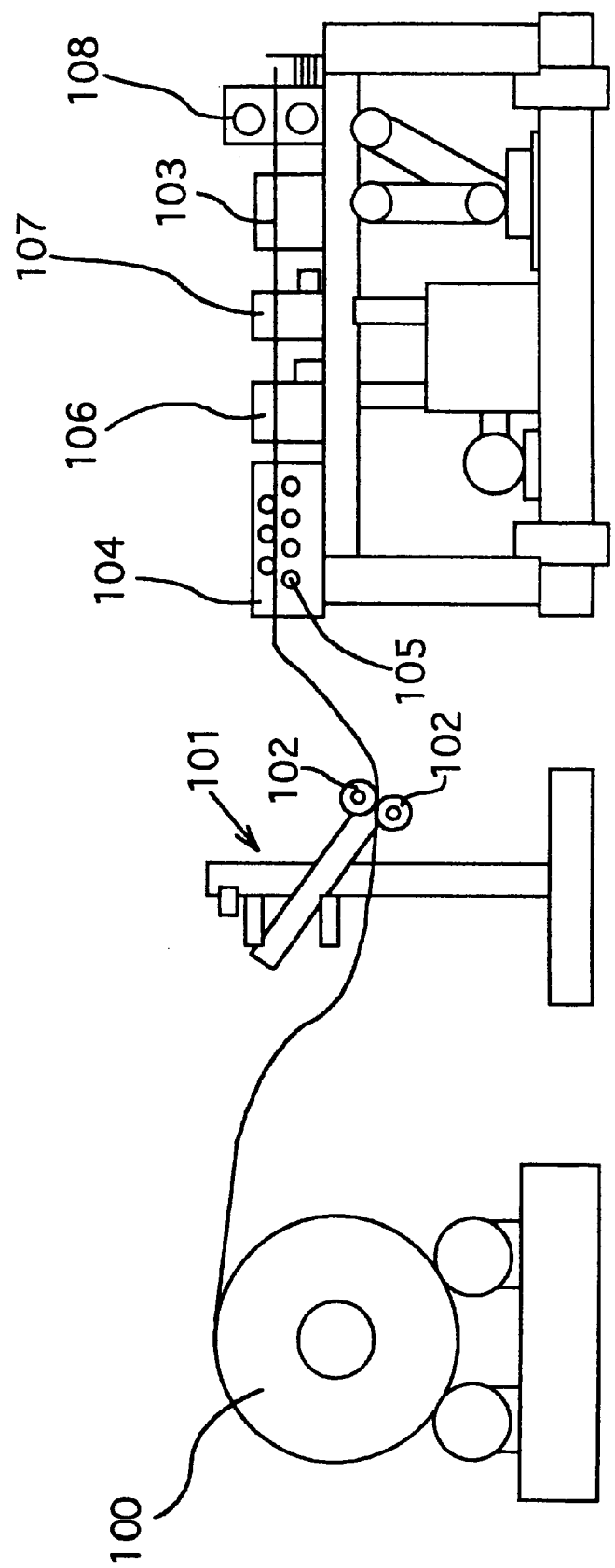
FIG. 19 is a schematic view showing coating peeling processes according to a sixth embodiment of the present invention.
Figure 20A:
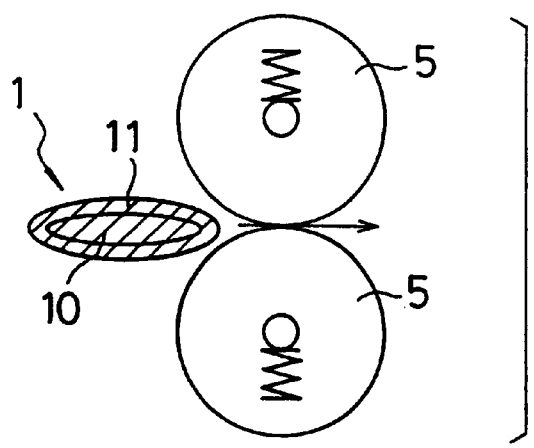
FIG. 20A is a view showing a first peeling process in a conventional coating peeling method of an insulated conductive wire as a prior art.
Figure 20B:
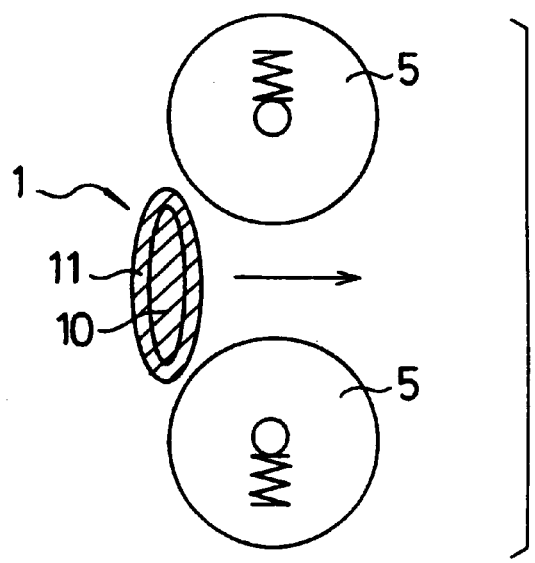
FIG. 20B is a view showing a second peeling process in the conventional coating peeling method of the insulated conductive wire as a prior art.

In an apparatus shown in FIG. 19, the near square shaped cross sectional insulated conductive wire 1 is wound around a dram 100. The leading end of the insulated conductive wire 1 drew out from the dram 100 is put to an end of the apparatus on opposite side to dram 100. The insulated conductive wire 1 is conveyed at a given feed speed by a pair of feed rollers (not shown) of a feed portion 103 via a pair of cushion rollers 102 of a cushion portion 101 where a pulling tension of the insulated conductive wire 1 is loosed.

The insulated conductive wire 1 is moved to a first peeling process portion 106 after removing a distortion thereof at a distortion removing portion 104 constituted by a plurality of rollers 105. At the first peeling process portion, the coating 11 at the peeling portion of the insulated conductive wire 1 is peeled off except the residual coatings 41 and 42 by the grinding stones 21 and 22 shown in FIG. 15A. Then, the insulated conductive wire 1 is moved to a second peeling process portion 107 where the residual coatings 41 and 42 are peeled off by the grinding stones 28 and 29 shown in FIG. 16. Finally, the insulated conductive wire 1 is moved to a cutting portion 108 where the insulated conductive wire is divided by cutting into a small piece having a predetermined length.

To prevent the coating 11 outside the peeling region from being peeled off by the grinding stones 21, 22, 28 and 29, a feeding of the insulated conductive wire 1 stops when a leading end of the peeling portion reaches a place where the grinding stones 21 and 22 of the first peeling process portion 106 are to come in contact therewith. Then, the grinding stones 21 and 22 move toward the insulated conductive wire 1 in parallel with the center axis direction thereof or perpendicularly to the center axis direction thereof until the grinding stones 21 and 22 come in contact with the insulated conductive wire 1. Next, the feeding of the insulated conductive wire 1 restarts and the grinding stones 21 and 22 continue to peel off the coating 11 except the residual coatings 41 and 42. The restarted feeding of the insulated conductive wire 1 stops when the other leading end of the peeling portion reaches a position where the grinding stones 21 and 22 are to depart therefrom and the grinding stones 21 and 22 moves in reverse so as to depart from the insulated conductive wire 1 in parallel with the center axis direction thereof or perpendicularly to the center axis direction thereof.

Further, at the second peeling process portion 107, while the feeding of the insulated conductive wire 1 restarts and stops in a repeated way, the residual coatings 41 and 42 are peeled off by the grinding stones 28 and 29 moving similarly to the grinding stones 21 and 22 at the first peeling process portion 106.

Finally, at the cutting portion 108, the insulated conductive wire 1 is divided into a piece by cutting at the peeling region thereof, for example, at a center position of the peeling region thereof. Therefore, the divided piece of the insulated conductive wire 1 whose coatings on opposite sides thereof are completely peeled off is automatically and continuously manufactured.

If a distance between the pair of grinding stones 21 and 22 and the pair of the grinding stones 28 and 29 corresponds to a longitudinal length of the divided piece of the insulated conductive wire 1 multiplied by a certain integral number, the start and stop timings for feeding the insulated conductive wire 1 relative to the grinding stones 21, 22, 28 and 29 may be synchronized to each other, resulting in increasing manufacturing productivity.

What is claimed is:

1. A method of peeling off a coating of an insulated conductive wire at a peeling region covering a predetermined length in a longitudinal direction thereof by cutting edge means, the insulated conductive wire being constituted by a conductor and the coating covering and being entirely and strongly connected with the conductor all around an outer circumference thereof, comprising steps of:

forming a groove by removing the coating and a part of the conductor at a predetermined position of the peeling region; and executing a first peeling process of peeling off the coating on a surface of the insulated conductive wire at the peeling region by making the cutting edge means cut into the conductor so as to penetrate through the coating at a leading end of the peeling region and moving the cutting edge means relatively to the insulated conductive wire in a longitudinal direction thereof toward the groove.

2. A method according to claim 1, wherein the insulated conductive wire has first and second surfaces and the cutting edge means comprises first and second cutting edge members, further comprising steps of:

Before or after the first peeling process executed on the first surface by the first cutting edge member, executing a second peeling process of peeling off the coating on the second surface at the peeling region by moving the second cutting edge member relatively to the insulated conductive wire in a direction perpendicular to the longitudinal direction thereof so that the coating all around the outer circumference of the insulated conductive wire at the peeling region may be peeled off.

3. A method according to claim 2, wherein a width length of the second cutting edge member corresponds to a length of the peeling region in a longitudinal direction of the insulated conductive wire.

4. A method according to claim 2, wherein a pair of the first surfaces are respectively put between a pair of the second surfaces in opposite angle directions to each other, the second cutting edge member comprises a pair of second cutting edges and the coatings on the pair of second surfaces are simultaneously peeled off by the pair of second cutting edges.

5. A method according to claim 1, wherein the relative movement of the cutting edge means to the insulated conductive wire in a longitudinal direction thereof toward the groove is repeated so that the coatings all around the outer circumference of the insulated conductive wire at the peeling region may be peeled off.

6. A method according to claim 1, wherein the first cutting edge means comprises two of first cutting edge members, the groove is formed about in a longitudinal center of the peeling region, and the two of first cutting edge members are moved toward the groove from opposite leading ends of the peeling region, respectively.

7. A method according to claim 1, wherein the groove is formed all around a circumference of the insulated conductive wire.

8. A method according to claim 1, wherein a cutting edge profile of the cutting edge means is analogous to an outline shape of the outer circumference of the insulated conductive wire.

9. A method according to claim 1, wherein the groove is formed in a trapezoidal shape.

10. A method according to claim 2, wherein the insulated conductive wire has an elliptical cross section, the second cutting edge member is moved in parallel with a longer diameter of the elliptical cross section and perpendicularly to the longitudinal direction of the insulated conductive wire to peel off the coating on opposite sides of a shorter diameter of the elliptical cross section, and the first cutting edge member is moved in the longitudinal direction of the insulated conductive wire to peel off the coating on opposite sides of the longer diameter of the elliptical cross section.

11. A method according to claim 1, further comprising steps of:

dividing the insulated conductive wire into a piece by cutting at a position of the groove perpendicular to the longitudinal direction of the insulated conductive wire after peeling off the coating all around the circumference of the insulated conductive wire at the peeling region.

12. A method of peeling off a coating of an insulated conductive wire at a peeling region covering a predetermined length in a longitudinal direction thereof by cutting tools, the insulated conductive wire being constituted by a conductor and the coating covering and being entirely and strongly connected with the conductor around an outer circumference thereof and having a near square shaped cross section at least at the peeling region so that first and third side faces thereof are opposed to each other and second and fourth side surfaces thereof are opposed to each other, respectively, comprising steps of:

peeling off the coatings on the respective first to fourth faces at the peeling region by moving each of the cutting tools relatively to each of the first to fourth side faces in parallel therewith and perpendicularly to a longitudinal direction of the insulated conductive wire without moving in the longitudinal direction of the insulated conductive wire toward a side face immediately adjacent to the each of the first to fourth side faces, while making the each of the cutting tools continuously cut into the conductor through the coating.

13. A method according to claim 12, wherein the cutting tools comprise a pair of first cutting edges and a pair of second cutting edges and the coatings on the first and third faces are simultaneously peeled off by the pair of first cutting edges and the coatings on the second and fourth faces are simultaneously peeled off by the pair of second cutting edges.

14. A method according to claim 12, wherein an each width length of the cutting tools corresponds to a length of the peeling region in a longitudinal direction of the insulated conductive wire.

15. A method according to claim 12, wherein the near square shaped cross section of the insulated conductive wire is formed by deforming a base wire having originally a nearly round cross section before peeling off the coating.

16. A method according to claim 15, wherein the base wire has a flat oval shaped cross section and the near square cross section of the insulated conductive wire is formed by pressing in a longer diameter direction of the flat oval shaped cross section.

17. A method according to claim 12, further comprising:
peeling off the coating on any one of corners put between the adjacent two surfaces of the first to fourth faces by moving any one of the cutting tools perpendicularly to the longitudinal direction of the insulated conductive wire so that the insulated conductive wire may be formed in a nearly octagonal cross section to peel off the coating all around the outer circumference of the insulated conductive wire at the peeling region.

18. A method according to claim 17, wherein the cutting tools comprise a pair of first cutting edges and a pair of second cutting edges and the coatings on the corners put between the first and second faces and on the corners put between the third and fourth faces are simultaneously peeled off by the pair of first cutting edges and the coatings on the corners put between the second and third faces and on the corners put between the fourth and first faces are simultaneously peeled off by the pair of second cutting edges.

19. A method according to claim 17, wherein the coatings on the respective corners are peeled off before peeling off the coatings on the first to fourth faces.

20. A method according to claim 12, further comprising steps of:
dividing the insulated conductive wire into a piece about at a longitudinal center of the peeling region by cutting after peeling off the coating all around the circumference of the insulated conductive wire.

21. A method according to claim 20, wherein any one of the cutting tools to be used in peeling off the coating on the first to fourth faces is provided integrally with a groove cutting edge at a position thereof corresponding to a predetermined position of the peeling region where the insulated conductive wire is divided into a piece so that a groove may be formed in advance at the predetermined position of the peeling region by making the groove cutting edge cut deep into the conductor and cutting off a part of the conductor.

22. A method according to claim 21, wherein the part of the conductor is cut off by the groove cutting edge to form the groove at a state that any two of the first to fourth faces opposing to each other are held between any one pair of the pairs of first and second cutting edges after the coatings thereof are peeled off by the one pair of the pairs of first and second cutting edges.

23. A method of peeling off a coating of a near square shaped cross sectional insulated conductive wire at a peeling region covering a predetermined length in a longitudinal direction thereof by grinding stone means, the insulated conductive wire being constituted by a conductor and the coating covering the conductor around an outer circumference thereof and having four round corner surfaces and four nearly flat side surfaces, comprising steps of:
peeling off simultaneously the coatings at the peeling region on any one corner surface of the four corner surfaces and on adjacent any two side surfaces of the four side surfaces between which the any one corner surface is put by making the any one corner surface and the adjacent any two side surfaces come in contact with any one of the grinding stone means whose grinding surface has a profile corresponding to shapes of the any one corner surface and the adjacent two any side surfaces and moving the insulated conductive wire relatively to the any one of the grinding stone means in a longitudinal direction thereof.

24. A method according to claim 23, wherein one of the any adjacent two side surfaces is a first surface and the other of the any adjacent two side surfaces is a second surface whose width length is narrower than that of the first surface, the grinding surface of the any one of the grinding stones has a column shaped surface extending in an axial direction thereof, a disk shaped surface extending in a radial direction and a corn shaped surface between the column and disk shaped surfaces, a diameter of the corn shaped surface being larger toward the disk shaped surface from the column shaped surface, and the column shaped surface comes in contact with the first surface and the disk shaped surface comes in contact with the second surface.

25. A method according to claim 23, wherein the grinding stone means have a pair of grinding stones arranged between the insulated conductive wire in opposite angle directions thereof so that the coatings on two of the four corner surfaces in opposite angle directions to each other and on four side surfaces may be peeled off simultaneously.

26. A method according to claim 25, wherein the grinding stone means have an another pair of grinding stones arranged between the insulated conductive wire in opposite angle directions thereof so that the coating on the other two of the four corner surfaces in opposite angle directions to each other may be peeled off simultaneously.

27. A method according to claim 23, further comprising steps of:
dividing the insulated conductive wire into a piece by cutting at a predetermined position of the peeling region perpendicular to the longitudinal direction of the insulated conductive wire after peeling off the coating all around the circumference of the insulated conductive wire at the peeling region.

28. A method according to claim 23, wherein the grinding stone means rotates at a relatively high speed and the grinding surface of the grinding stone means is roughly finished so that the conductor at the peeling region may have a plurality of linear scratches extending in a longitudinal direction of the insulated conductive wire after the coating is peeled off by grinding.

29. A method according to claim 23, wherein the grinding stone means rotates at a relatively high speed and the grinding surface of the grinding stone means is roughly finished so that the conductor at the peeling region may have a satin finished surface having a plurality of fine concave and convex portions after the coating is peeled off by grinding.

* * * * *